UNITED STATES PATENT OFFICE.

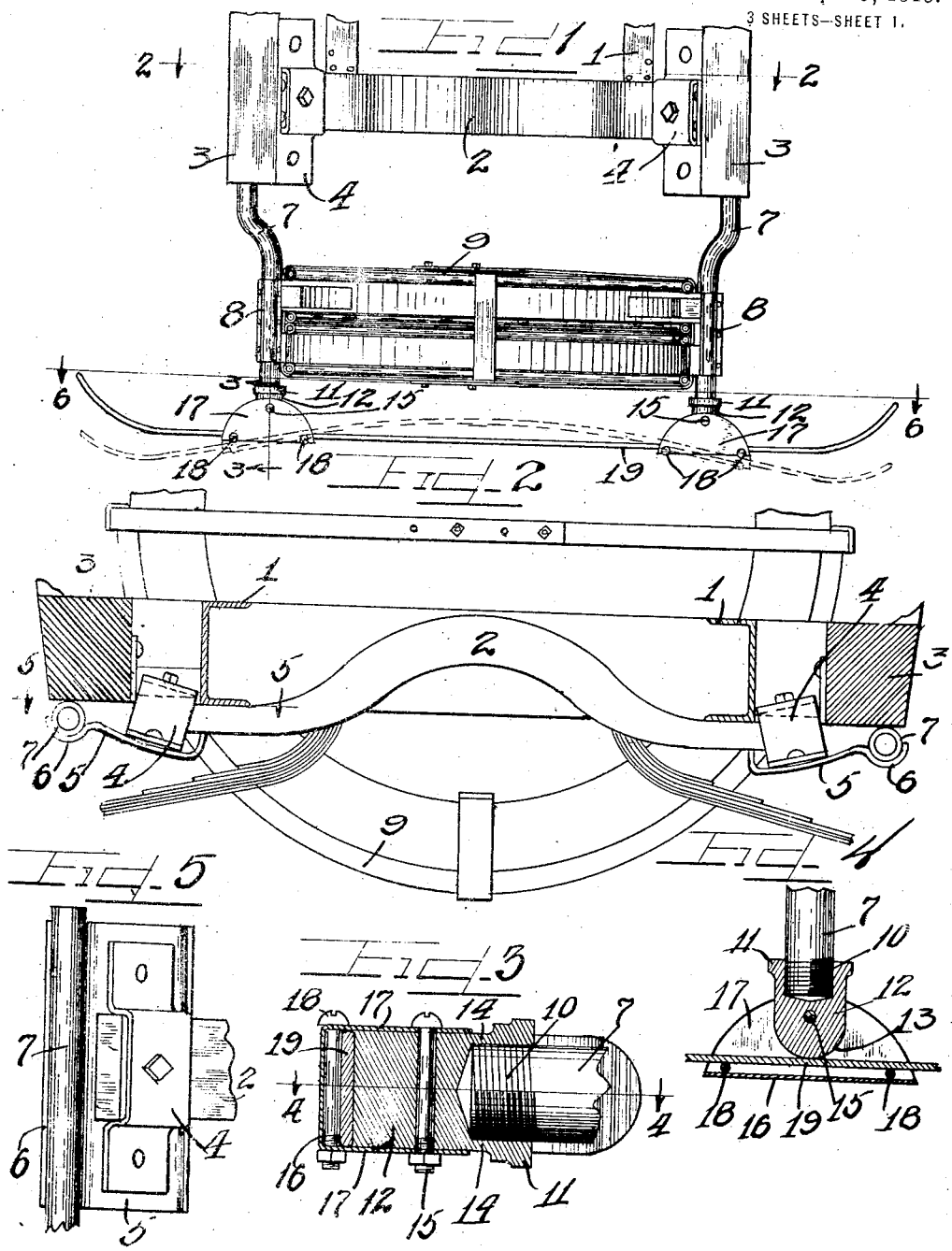

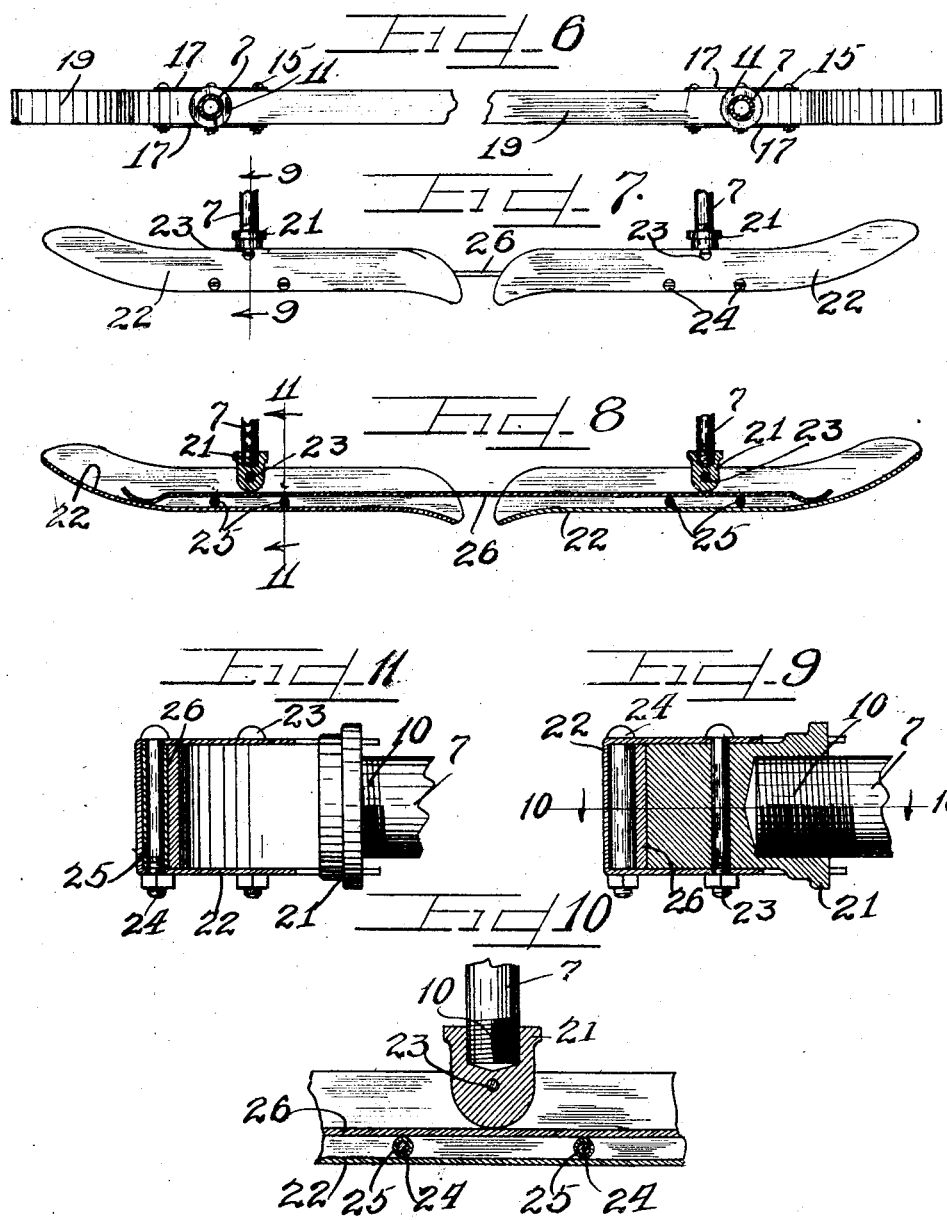

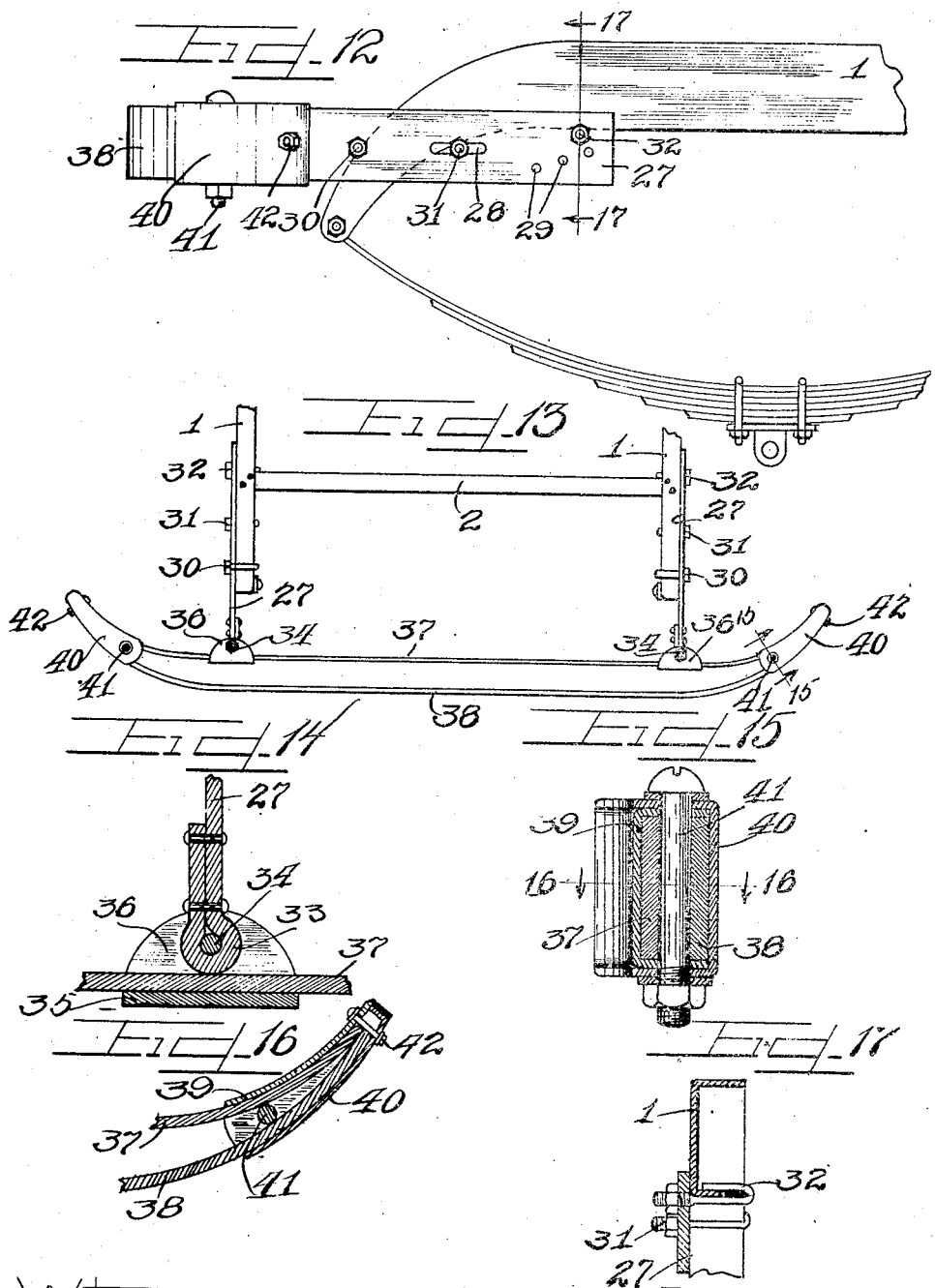

WALTER R. GREEN, OF CHICAGO, ILLINOIS.

BUMPER.

1,311,557.

Specification of Letters Patent.

Patented July 29, 1919.

Application filed January 2, 1918. Serial No. 209,512.

*To all whom it may concern:*

Be it known that I, WALTER R. GREEN, a citizen of the United States, and a resident of the city of Chicago, in the county of Cook and State of Illinois, have invented certain new and useful Improvements in Bumpers; and I do hereby declare that the following is a full, clear, and exact description of the same, reference being had to the accompanying drawings, and to the numerals of reference marked thereon, which form a part of this specification.

This invention relates to an improved form of adjustable bumper adapted to be mounted upon the rear end of an automobile.

It is an object of this invention to construct an adjustable and flexible rear bumper for automobiles.

It is also an object of the invention to provide an adjustable rear bumper for a motor car adapted to be attached to the supporting rods of a tire carrier.

A further object of this invention is the construction of a rear automobile bumper having a bumper bar frictionally held in position by brackets secured on rods forming a part of a tire carrier.

Another object of the invention is the construction of an automobile rear bumper wherein a bumper bar is supported in position in pivoted supports attached to supporting arms mounted on the rear end of the chassis of the automobile.

An important object of this invention is the construction of an automobile rear bumper of simple and effective construction wherein pivoted supports are mounted upon supporting rods attached to the automobile chassis, and are adapted to frictionally hold a flexible bumper bar in position and permit movement of said bar with respect thereto when the bar is stressed.

Other and further important objects of this invention will be apparent from the disclosures in the specification and drawings.

The invention (in a preferred form) is illustrated in the drawings and hereinafter more fully described.

In the drawings:

Figure 1 is a top plan view of a rear bumper embodying the principles of this invention, shown mounted in position on tire carrier supporting rods secured to the rear end of the chassis of a motor car.

Fig. 2 is an enlarged sectional view taken on line 2—2 of Fig. 1, with parts omitted and with parts in elevation.

Fig. 3 is an enlarged fragmentary detail section partly in elevation taken on line 3—3 of Fig. 1.

Fig. 4 is a reduced section taken on line 4—4 of Fig. 3, with parts shown in elevation.

Fig. 5 is a fragmentary detail view taken on line 5—5 of Fig. 2.

Fig. 6 is a sectional view on line 6—6 of Fig. 1.

Fig. 7 is a top plan view of a modified form of the device.

Fig. 8 is a longitudinal central section thereof.

Fig. 9 is an enlarged section taken on line 9—9 of Fig. 7.

Fig. 10 is a reduced detail section on line 10—10 of Fig. 9.

Fig. 11 is an enlarged detail section taken on line 11—11 of Fig. 8.

Fig. 12 is an end elevational view of another modified form of the device shown attached to the chassis of an automobile.

Fig. 13 is a reduced top plan view thereof.

Fig. 14 is an enlarged fragmentary horizontal detail section taken through one of the bumper supports.

Fig. 15 is an enlarged detail section taken on line 15—15 of Fig. 13.

Fig. 16 is a detail section taken on line 16—16 of Fig. 15.

Fig. 17 is a fragmentary detail section on line 17—17 of Fig. 12.

As shown on the drawings:

The reference numeral 1, indicates the longitudinal or side sills of an automobile chassis. Said side sills have rigidly connected to the rear ends thereof, an arched or yoke-shaped rear sill member 2. Disposed to the outside of the side sills 1, are the wooden side sills 3, of the body of the automobile. Attached over the extended ends of the rear sills 2, are bracket plates 4, shown in detail in Fig. 5, and riveted thereto are spring plates 5, provided with a semi-circular, channeled or grooved marginal portion 6, in which the inner ends of tubular bracket arms or supporting rods 7, are seated and held confined beneath the body sills 3, of the car, thus supporting said bracket arms 7, in position, with the outer ends thereof extending rearwardly of the car, as clearly shown in Fig. 1.

Rigidly supported on the outer portions of the bracket arms 7, by means of clamping members 8, is a tire carrier represented as a whole by the reference numeral 9. The outer ends of the bracket arms 7, are externally threaded, as denoted by the numeral 10, and removably threaded thereon are adjustable bumper brackets or bumper supports, each comprising a stationary coupler, one end of which is enlarged to form a head 11, which is longitudinally passaged and internally threaded to fit on the end of one of the bracket arms, while the other or outer end of the coupler is integral with the head 11, and forms a bearing or supporting sleeve or collar 12, the outer end portion of which is rounded, as denoted by the reference numeral 13. The upper and lower surfaces 14, of the coupler sleeve 12, are flat and parallel to one another.

For a purpose hereinafter described, the coupler sleeve is provided with a vertically disposed passage, positioned at right angles to the threaded passage of the head portion of the coupler. Pivotally supported on the coupler sleeve, by means of a pivot bolt 15, which projects through the vertical sleeve passage, is a U-cross-sectioned or channel cross-sectioned support embracing a rectangular plate 16, having integrally formed at right angles thereto along the upper and lower marginal edges thereof, semi-circular plates or flanges 17, through which the pivot bolt projects, to hold said flange plates 17, against the flat surfaces 14, of the coupler. A bearing bolt 18, at each end of the U-shaped member connects the respective upper and lower flange plates 17, to one another to reinforce the same, with the bearing bolts disposed to the inside of the plate 16, near each end thereof, to form bracing posts.

Movably projecting through the U-shaped bumper supporting members is a flexible metal bar 19, the ends of which are curved inwardly toward the car. Said bumper bar 19, normally is frictionally held in position by means of the curved ends 13, of the coupler sleeves 12, which normally are disposed at right angles to the bumper bar, which is held braced against the bearing bolts 18, as clearly shown in Fig. 4.

Figs. 7 to 11, inclusive, disclose a modified form of the device which embraces couplers 21, removably threaded on the threaded ends 10, of the bracket arms 7. Said couplers have the outer ends thereof curved as previously described, and are vertically apertured to permit a curved channel cross-sectioned bumper member 22, to be pivotally mounted on each thereof by means of a pivot bolt 23. Projecting through the upper and lower flanges of the bumper member 22, near the connecting plates thereof, are bolts 24, each of which has rotatably mounted thereon a bearing sleeve 25. A flexible metal bumper bar or spring 26, connects the bumper members 22, and is disposed within said members between the bearing sleeves 25, and the curved bearing ends of the couplers 21, which normally frictionally engage said bumper bar to hold the same in position against movement. As shown in Fig. 8, the bumper bar bridges the space between the pivoted bumper members 22, and has the ends thereof curved to afford suitable bearing ends which press against the inner surfaces of the connecting plates of said bumper members.

Another modified form of the device is disclosed in Figs. 12 to 17, inclusive and embraces attaching arms, plates or bars 27, each provided with a longitudinal slot 28, intermediate the ends thereof, and a plurality of apertures or openings 29, near the rear end to permit said bars to be attached or fitted to chassis sills of different sizes. Projecting through an opening near the forward end of each supporting plate 27, is a hook bolt 30, which is adapted to rest upon the upper curved surface of one of the chassis sills 1, with the hooked portion of said bolt engaged around the upper flange of said sill thereby holding the front portion of the plate in position. A hook bolt 31, is engaged through the slot 28, and has the hooked portion thereof engaged around the lower flange of one of the chassis sills 1, as clearly shown in Fig. 17. The slot 28, affords a means whereby the plate 27, may be attached to chassis sills of different sizes. To secure the rear end of each of the plates 27, in position, a hook bolt 32, is engaged through one of the apertures 29, of each of said plates, with the hooked portion of each of said bolts 32, engaged around the lower flange of the respective chassis sills.

The outer end of each of the supporting or mounting plates 27, is looped and folded upon itself to form a rounded abutment head 33, through which projects a pivot bolt 34, adapted to pivotally hold a U-cross-sectioned or channel support in position. Said channel support embraces a rectangular plate 35, having integrally formed at right angles thereto along the upper and lower marginal edges thereof, semi-circular plates or flanges 36, through which the pivot bolt projects, to hold said flange plates 36, against the upper and lower flat surfaces of the supporting plate heads 33.

Movably projecting through the channel supports 35—36, is an inner flexible metal bar 37, the ends of which are curved inwardly toward the car. The inner bumper bar 37, is frictionally engaged in the channel supports between the rounded heads 33, and the connecting plates 35, of the channel supports. A rear or outer bumper bar 38, is spaced from the inner bumper bar 37, and has the ends thereof curved inwardly. The adjacent ends of the bumper bars 37 and 38, are clamped or secured to one another by means of a curved inner channel clamp 39, which telescopes or interfits with an outer channel clamp 40. The flanges of said clamps 39 and 40, are apertured to permit an attaching or wedge bolt 41, to engage through said flanges and wedge between said bumper bars 37 and 38, to hold the same spaced apart. The flanges of said clamps 39 and 40, are tapered and projecting through the outer ends of the clamps is a bolt 42, against which the respective ends of the bumper bars 37 and 38, abut, thus affording an arrangement whereby the clamps 39 and 40, are prevented from sliding inwardly on the bumper bars, while the wedge bolts prevent outward movement of said clamps.

The operation is as follows:

In the form of bumper shown in Figs. 1 to 6, inclusive, the pivoted supports are mounted on the attaching members or couplers and are connected by means of the flexible bumper bar 19, which normally is frictionally held in position between the bearing bolts 18, and the curved ends 13, of the couplers. A force applied to the bumper bar between the pivoted supports thereof will flex or bend the same inwardly toward the car into the dotted line position shown in Fig. 1, simultaneously forcing the outer end portions of the bar rearwardly away from the car. The bending of the bumper bar pivotally turns the bumper supports inwardly toward one another, thus permitting the bumper bar to slidably move a slight amount between the respective bearing bolts and the outer curved ends of the couplers. It will also be seen that a force applied to the curved ends of the bumper bar will bend or flex the central portion of the bumper bar outwardly, turning the pivoted bumper supports outwardly away from each other. The stressed bumper bar, of course, automatically springs back into normal position when the bending force is removed.

The operation of the form of bumper shown in Figs. 7 to 11, inclusive, is very simple. In this case the shock receiving members are the pivoted supports 22, which, when struck, turn on their pivots and flex or bend the spring bumper bar 26, which in its bending movement is permitted to move slightly on the roller bearing sleeves 25. The bumper bar 26, of course, returns the pivoted supports to normal position after the stress has been removed.

The operation of the double bumper shown in Figs. 12 to 17, inclusive, is similar to that already described. In this case, however, when the bumper is struck the force is received by the outer bumper bar 38, which of course is stressed inwardly, whereby the ends of said bar 38, are forced outwardly thus bending or flexing the inner bumper bar 37, which is permitted to bend, due to the pivoted arrangement of the channel supports 35—36. The double bumper bar construction acts to absorb or diffuse the shocks applied thereto, and thus reduces or minimizes the force of the shocks before the same are transmitted to the chassis of the vehicle to which the bumper is attached.

While the bumper mechanisms shown are mounted upon bracket arms at the rear end of an automobile, it will be understood that the same may also be readily mounted in position at the front end of a vehicle.

I am aware that numerous details of construction may be varied through a wide range without departing from the principles of this invention, and I therefore do not purpose limiting the patent granted otherwise than necessitated by the prior art.

I claim as my invention:

1. A device of the class described, comprising rigid supports, means pivotally engaged on each thereof, and a resilient unitary member having frictional sliding engagement with each of said means to permit flexing of said member both inwardly and outwardly with respect thereto.

2. A bumper embracing stationary supports, means pivotally supported thereon, and a flexible bumper means frictionally held in position between said supports and said first mentioned means.

3. An automobile bumper comprising pivotally mounted supports, and a resilient bumper member frictionally held in position thereby.

4. In a bumper for automobiles, stationary attaching members, means pivotally supported thereon, bearing members therein, and a bumper bar frictionally held in position between said stationary members and said bearing members.

5. In a bumper of the class described, bracket arms adapted to be secured to an automobile chassis, a coupler removably supported on the outer end of each bracket arm, a support pivotally mounted on each of said couplers, bearing members in each of said supports, and a flexible spring bumper bar supported by said supports and frictionally held in normal position between said couplers and said bearing members.

6. A bumper comprising a flexible bumper member, and pivoted means supporting the same in sliding relation to permit flexing of the member in either direction.

7. A bumper embracing a flexible bar, and means frictionally supporting the bar in position and in sliding relation with said means.

8. A bumper consisting of a bumper bar, and pivoted means frictionally and slidably engaged with said bar for holding the bar in position.

9. The combination with the tire carrier supports of an automobile, of a bumper bar, and means pivotally connected to said supports for frictionally holding said bar in position.

10. The combination with the bracket arms of a tire carrier, of couplers removably secured thereon, supporting members pivoted on said couplers, and a bumper bar movably supported by said members.

In testimony whereof I have hereunto subscribed my name in the presence of two subscribing witnesses.

WALTER R. GREEN.

Witnesses:
CHARLES W. HILLS, Jr.,
FRED E. PAESLER.